United States Patent [19]
Tipley

[11] Patent Number: 5,369,753
[45] Date of Patent: Nov. 29, 1994

[54] METHOD AND APPARATUS FOR ACHIEVING MULTILEVEL INCLUSION IN MULTILEVEL CACHE HIERARCHIES

[75] Inventor: Roger E. Tipley, Houston, Tex.

[73] Assignee: Compaq Computer Corporation, Houston, Tex.

[21] Appl. No.: 68,294

[22] Filed: May 27, 1993

Related U.S. Application Data

[63] Continuation of Ser. No. 538,894, Jun. 15, 1990, abandoned.

[51] Int. Cl.$^5$ ............................................. G06F 12/08
[52] U.S. Cl. .............................. 395/425; 364/DIG. 1; 364/243.45
[58] Field of Search ........................................ 395/425; 364/200 MS File, 900 MS File

[56] References Cited

U.S. PATENT DOCUMENTS

| | | | |
|---|---|---|---|
| 4,442,487 | 4/1984 | Fletcher et al. | 395/425 |
| 4,464,712 | 8/1984 | Fletcher | 395/425 |
| 4,493,026 | 1/1985 | Olnowich | 395/425 |
| 4,736,293 | 4/1988 | Patrick | 395/425 |
| 4,755,930 | 7/1988 | Wilson, Jr. et al. | 395/425 |
| 4,774,654 | 9/1988 | Pomerene et al. | 395/425 |
| 4,783,736 | 11/1988 | Ziegler et al. | 395/425 |
| 4,823,259 | 4/1989 | Aichelmann, Jr. et al. | 395/425 |
| 4,985,829 | 1/1991 | Thatte et al. | 395/425 |
| 5,023,776 | 6/1991 | Gregor | 395/425 |
| 5,072,369 | 12/1991 | Theus et al. | 395/425 |
| 5,091,846 | 2/1992 | Sachs et al. | 395/250 |
| 5,133,074 | 7/1992 | Chou | 395/725 |
| 5,136,700 | 8/1992 | Thacker | 395/400 |
| 5,163,140 | 11/1992 | Stiles et al. | 395/425 |
| 5,202,972 | 4/1993 | Gusefski et al. | 395/425 |
| 5,253,353 | 10/1993 | Mogul | 395/425 |

OTHER PUBLICATIONS

Intel Corp., "Intel 1989 Microprocessor & Peripheral Handbook, 82385 Cache Controller Specification", pp. 4-292 to 4-353.

Intel Corp., "Intel i486 Microprocessor Handbook", Nov. 1989 edition, pp. 73-77.

Jean-Loup Baer & Wen-Hann Wang, Int. Conference on Parallel Processing, "Architectural Choices for Multi-Level Cache Hierarchies", Jan. 14, 1987.

Jean-Loop Baer & Wen-Hann Wang, IEEE, "On the Inclusion Properties for Multi-Level Cache Hierarchies", CH 2545-2/88, 1988, pp. 73-80.

Angel DeCagama, "The Technology of Parallel Processing, Parallel Processing Architectures and VLSI Hardware", vol. 1, 1989, pp. 318-331.

Jean-Loop Baer and Wen-Hann Wang; "Multilevel Cache Hierarchies: Organizations, Protocols, and Performance," 8318 *Journal of Parallel and Distributed Computing*, No. 3, Jun. 6, 1989, pp. 451-476.

Primary Examiner—Joseph L. Dixon
Assistant Examiner—Matthew M. Kim
Attorney, Agent, or Firm—Pravel, Hewitt Kimball & Krieger

[57] ABSTRACT

A method for achieving multilevel inclusion in a computer system with first and second level caches. The caches align on a "way" basis by their respective cache controllers communicating with each other which blocks of data they are replacing and which of their cache ways are being filled with data. On first and second level cache read misses the first level cache controller provides way information to the second level cache controller to allow received data to be placed in the same way. On first level cache read misses and second level cache read hits, the second level cache controller provides way information to the first level cache controller, which places data in the indicated way. On processor writes the first level cache controller caches the writes and provides the way information to the second level cache controller which uses the way information to select the proper way for data storage. An inclusion bit is set on data in the second level cache that is duplicated in the first level cache. On a second level cache snoop hit, the second level cache controller checks the respective inclusion bit to determine if a copy of this data also resides in the first level cache. The first level cache controller is directed to snoop the bus only if the respective inclusion bit is set.

12 Claims, 6 Drawing Sheets

METHOD AND APPARATUS FOR ACHIEVING MULTILEVEL INCLUSION IN MULTILEVEL CACHE HIERARCHIES

This is a continuation of co-pending application Ser. No. 07/538,894 filed on Jun. 15, 1990 now abandoned.

BACKGROUND OF THE INVENTION

1. Field of the Invention

The present invention relates to microprocessor cache subsystems in computer systems, and more specifically to a method for achieving multilevel inclusion among first level and second level caches in a computer system so that the second level cache controller can perform the principal snooping responsibilities for both caches.

2. Description of the Prior Art

The personal computer industry is a vibrant and growing field that continues to evolve as new innovations occur. The driving force behind this innovation has been the increasing demand for faster and more powerful computers. A major bottleneck in personal computer speed has historically been the speed with which data can be accessed from memory, referred to as the memory access time. The microprocessor, with its relatively fast processor cycle times, has generally been delayed by the use of wait states during memory accesses to account for the relatively slow memory access times. Therefore, improvement in memory access times has been one of the major areas of research in enhancing computer performance.

In order to bridge the gap between fast processor cycle times and slow memory access times, cache memory was developed. A cache is a small amount of very fast, and expensive, zero wait state memory that is used to store a copy of frequently accessed code and data from main memory. The microprocessor can operate out of this very fast memory and thereby reduce the number of wait states that must be interposed during memory accesses. When the processor requests data from memory and the data resides in the cache, then a cache read hit takes place, and the data from the memory access can be returned to the processor from the cache without incurring wait states. If the data is not in the cache, then a cache read miss takes place, and the memory request is forwarded to the system and the data is retrieved from main memory, as would normally be done if the cache did not exist. On a cache miss, the data that is retrieved from memory is provided to the processor and is also written into the cache due to the statistical likelihood that this data will be requested again by the processor.

An efficient cache yields a high "hit rate", which is the percentage of cache hits that occur during all memory accesses. When a cache has a high hit rate, the majority of memory accesses are serviced with zero wait states. The net effect of a high cache hit rate is that the wait states incurred on a relatively infrequent miss are averaged over a large number of zero wait state cache hit accesses, resulting in an average of nearly zero wait states per access. Also, since a cache is usually located on the local bus of the microprocessor, cache hits are serviced locally without requiring use of the system bus. Therefore, a processor operating out of its local cache has a much lower "bus utilization." This reduces system bus bandwidth used by the processor, making more bandwidth available for other bus masters.

Another important feature of caches is that the processor can operate out of its local cache when it does not have control of the system bus, thereby increasing the efficiency of the computer system. In systems without microprocessor caches, the processor generally must remain idle while it does not have control of the system bus. This reduces the overall efficiency of the computer system because the processor cannot do any useful work at this time. However, if the processor includes a cache placed on its local bus, it can retrieve the necessary code and data from its cache to perform useful work while other devices have control of the system bus, thereby increasing system efficiency.

Cache performance is dependent on many factors, including the hit rate and the cache memory access time. The hit rate is a measure of how efficient a cache is in maintaining a copy of the most frequently used code and data, and, to a large extent, it is a function of the size of the cache. A larger cache will generally have a higher hit rate than a smaller cache. Increasing the size of the cache, however, can possibly degrade the cache memory access time. However, cache designs for a larger cache can be achieved using cache memory with the fastest possible access times such that the limiting factor in the design is the minimum CPU access time. In this way, a larger cache would not be penalized by a possibly slower cache memory access time with respect to the memory access time of a smaller cache because the limiting factor in the design would be the minimum CPU access time.

Other important considerations in cache performance are the organization of the cache and the cache management policies that are employed in the cache. A cache can generally be organized into either a direct-mapped or set-associative configuration. In a direct-mapped organization, the physical address space of the computer is conceptually divided up into a number of equal pages, with the page size equaling the size of the cache. The cache is divided up into a number of sets, with each set having a certain number of lines. Each of the pages in main memory has a number of lines equivalent to the number of lines in the cache, and each line from a respective page in main memory corresponds to a similarly located line in the cache. An important characteristic of a direct-mapped cache is that each memory line from a page in main memory, referred to as a page offset, can only reside in the equivalently located line or page offset in the cache. Due to this restriction, the cache only need refer to a certain number of the upper address bits of a memory address, referred to as a tag, to determine if a copy of the data from the respective memory address resides in the cache because the lower order address bits are pre-determined by the page offset of the memory address.

Whereas a direct-mapped cache is organized as one bank of memory that is equivalent in size to a conceptual page in main memory, a set-associative cache includes a number of banks, or ways, of memory that are each equivalent in size to a conceptual page in main memory. Accordingly, a page offset in main memory can be mapped to a number of locations in the cache equal to the number of ways in the cache. For example, in a 4-way set associative cache, a line or page offset from main memory can reside in the equivalent page offset location in any of the four ways of the cache.

A set-associative cache generally includes a replacement algorithm that determines which bank, or way, with which to fill data when a read miss occurs. Many set-associative caches use some form of a least recently used (LRU) algorithm that places new data in the way that was least recently accessed. This is because, statistically, the way most recently used or accessed to provide data to the processor is the one most likely to be needed again in the future. Therefore, the LRU algorithm ensures that the block which is replaced is the least likely to have data requested by the cache.

Cache management is generally performed by a device referred to as a cache controller. The cache controller includes a directory that holds an associated entry for each set in the cache. This entry generally has three components: a tag, a tag valid bit, and a number of line valid bits equaling the number of lines in each cache set. The tag acts as a main memory page number, and it holds the upper address bits of the particular page in main memory from which the copy of data residing in the respective set of the cache originated. The status of the tag valid bit determines whether the data in the respective set of the cache is considered valid or invalid. If the tag valid bit is clear, then the entire set is considered invalid. If the tag valid bit is true, then an individual line within the set is considered valid or invalid depending on the status of its respective line valid bit.

A principal cache management policy is the preservation of cache coherency. Cache coherency refers to the requirement that any copy of data in a cache must be identical to (or actually be) the owner of that location's data. The owner of a location's data is generally defined as the respective location having the most recent version of the data residing in the respective memory location. The owner of data can be either an unmodified location in main memory, or a modified location in a write-back cache. In computer systems where independent bus masters can access memory, there is a possibility that a bus master, such as a direct memory access controller, network or disk interface card, or video graphics card, might alter the contents of a main memory location that is duplicated in the cache. When this occurs, the cache is said to hold "stale" or invalid data. In order to maintain cache coherency, it is necessary for the cache controller to monitor the system bus when the processor does not own the system bus to see if another bus master accesses main memory. This method of monitoring the bus is referred to as snooping.

The cache controller must monitor the system bus during memory reads by a bus master in a write-back cache design because of the possibility that a previous processor write may have altered a copy of data in the cache that has not been updated in main memory. This is referred to as read snooping. On a read snoop hit where the cache contains data not yet updated in main memory, the cache controller generally provides the respective data to main memory, and the requesting bus master generally reads this data en route from the cache controller to main memory, this operation being referred to as snarfing. The cache controller must also monitor the system bus during memory writes because the bus master may write to or alter a memory location that resides in the cache. This is referred to as write snooping. On a write snoop hit, the cache entry is either marked invalid in the cache directory by the cache controller, signifying that this entry is no longer correct, or the cache is updated along with main memory. Therefore, when a bus master reads or writes to main memory in a write-back cache design, or writes to main memory in a write-through cache design, the cache controller must latch the system address and perform a cache look-up in the tag directory corresponding to the page offset location where the memory access occurred to see if the main memory location being accessed also resides in the cache. If a copy of the data from this location does reside in the cache, then the cache controller takes the appropriate action depending on whether a read or write snoop hit has occurred. This prevents incompatible data from being stored in main memory and the cache, thereby preserving cache coherency.

Another consideration in the preservation of cache coherency is the handling of processor writes to memory. When the processor writes to main memory, the memory location must be checked to determine if a copy of the data from this location also resides in the cache. If a processor write hit occurs in a write-back cache design, then the cache location is updated with the new data and main memory may be updated with the new data at a later time or should the need arise. In a write-through cache, the main memory location is generally updated in conjunction with the cache location on a processor write hit. If a processor write miss occurs, the cache controller may ignore the write miss in a write-through cache design because the cache is unaffected in this design. Alternatively, the cache controller may perform a "write-allocate" whereby the cache controller allocates a new line in the cache in addition to passing the data the data to the main memory. In a write-back cache design, the cache controller generally allocates a new line in the cache when a processor write miss occurs. This generally involves reading the remaining entries to fill the line from main memory before or jointly with providing the write data to the cache. Main memory is updated at a later time should the need arise.

Caches have generally been designed independently of the microprocessor. The cache is placed on the local bus of the microprocessor and interfaced between the processor and the system bus during the design of the computer system. However, with the development of higher transistor density computer chips, many processors are currently being designed with an on-chip cache in order to meet performance goals with regard to memory access times. The on-chip cache used in these processors is generally small, an exemplary size being 8 kbytes in size. The smaller, on-chip cache is generally faster than a large off-chip cache and reduces the gap between fast processor cycle times and the relatively slow access times of large caches.

In computer systems that utilize processors with on-chip caches, an external, second level cache is often added to the system to further improve memory access time. The second level cache is generally much larger than the on-chip cache, and, when used in conjunction with the on-chip cache, provides a greater overall hit rate than the on-chip cache would provide by itself.

In systems that incorporate multiple levels of caches, when the processor requests data from memory, the on-chip or first level cache is first checked to see if a copy of the data resides there. If so, then a first level cache hit occurs, and the first level cache provides the appropriate data to the processor. If a first level cache miss occurs, then the second level cache is then checked. If a second level cache hit occurs, then the data is provided from the second level cache to the processor. If a second level cache miss occurs, then the data is retrieved from main memory. Write operations are similar, with mix and matching of the operations discussed above being possible.

In multilevel cache systems, it has generally been necessary for each cache to snoop the system bus during memory writes by other bus masters in order to maintain cache coherency. When the microprocessor does not have control of the system bus, the cache controllers of both the first level and second level caches are required to latch the address of every memory write and check this address against the tags in its cache directory. This considerably impairs the efficiency of the processor working out of its on-chip cache during this time because it is continually being interrupted by the snooping efforts of the cache controller of the on-chip cache. Therefore, the requirement that the cache controller of the on-chip cache snoop the system bus for every memory write degrades system performance because it prevents the processor from efficiently operating out of its on-chip cache while it does not have control of the system bus.

In many instances where multilevel cache hierarchies exist with multiple processors, a property referred to as multilevel inclusion is desired in the hierarchy. Multilevel inclusion provides that the second level cache is guaranteed to have a copy of what is inside the first level, or on-chip cache. When this occurs, the second level cache is said to hold a superset of the first level cache. Multilevel inclusion has mostly been used in multi-processor systems to prevent cache coherency problems. When multilevel inclusion is implemented in multi-processor systems, the higher level caches can shield the lower level caches from cache coherency problems and thereby prevent unnecessary blind checks and invalidations that would otherwise occur in the lower level caches if multilevel inclusion were not implemented.

SUMMARY OF THE INVENTION

The present invention includes a method for achieving multilevel inclusion among first and second level caches in a computer system. Multilevel inclusion obviates the necessity of the cache controller of the first level cache to snoop the system bus for every memory write that occurs while the processor is not in control of the system bus because the cache controller of the second level cache can assume this duty for both caches. This frees up the first level cache controller and thereby allows the microprocessor to operate more efficiently out of the first level cache when it does not have control of the system bus.

The second level cache preferably has a number of ways equal to or greater than the number of ways in the first level cache. The first level and second level caches are 4-way set associative caches in the preferred embodiment of the present invention. In this embodiment there is a one-to-one correspondence between the cache ways in the first level cache and the cache ways in the second level cache. During a first level cache line fill from main memory, the first level cache controller communicates to the second level cache controller the particular first level cache way in which the data is to be placed so that the second level cache controller can place the data in the corresponding second level cache way. When the second level cache controller is transmitting a copy of data to the first level cache controller, the second level cache controller informs the first level cache controller which second level cache way the data is coming from. The first level cache controller disregards its normal replacement algorithm and fills the corresponding first level cache way. In this manner, the first and second level caches align themselves on a "way basis." This "way" alignment prevents the second level cache controller from placing data in a different way than the first level cache and in the process possibly discarding data that resides in the first level cache.

The cache organization of the first level cache according to the present invention is a write-through architecture. On a processor write, the information is preferably written to the first level cache, regardless of whether a write hit or write miss occurs, and external write bus cycles are initiated which write the information to the second level cache. The first level cache broadcasts the particular first level cache way where the data was placed to the second level cache controller so that the second level cache controller can place the data in the corresponding second level cache way, thereby retaining the "way" alignment. The second level cache is preferably a write-back cache according to the preferred embodiment, but could be a write-through cache if desired.

The second level cache controller utilizes an inclusion bit with respect to each line of data in the second level cache in order to remember whether a copy of this data also resides in the first level cache. When a location in the first level cache is replaced, whether concurrently with a second level cache replacement from memory or directly from the second level cache, the second level cache controller sets an inclusion bit for that location in the second level cache to signify that a copy of this data is duplicated in the first level cache. When this occurs, all other locations in the second level cache that correspond to the same location in the first level cache have their inclusion bits cleared by the second level cache controller to signify that the data held in these locations does not reside in the first level cache.

The second level cache controller performs the principal snooping duties for both caches when the processor does not have control of the system bus. When a write snoop hit occurs in the second level cache, the inclusion bit is read by the second level cache controller to see whether the first level cache controller must also snoop the memory access. If the inclusion bit is not set, then the first level cache controller is left alone. If the inclusion bit is set, then the second level cache controller directs the first level cache controller to snoop that particular memory access. In this manner, the first level cache controller can neglect its snooping duties until the second level cache controller determines that a write snoop hit on the first level cache has actually occurred. This allows the processor to operate more efficiently out of its first level cache when it does not have control of the system bus.

BRIEF DESCRIPTION OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENT

Figure 1:
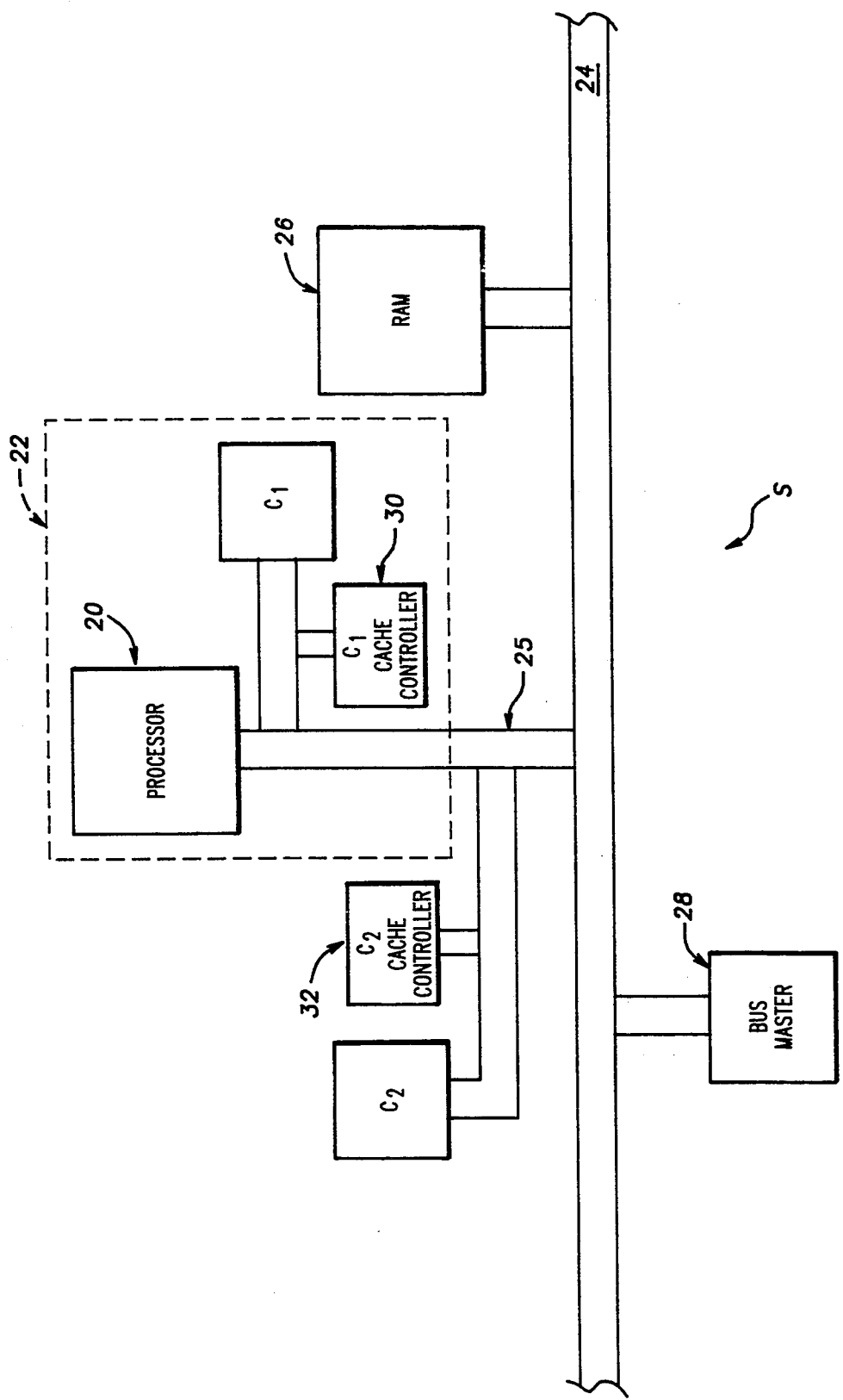
FIG. 1 is a block diagram of a computer system including first and second level caches and implementing multilevel inclusion according to the present invention.

Referring now to FIG. 1, a computer system S is generally shown. Many of the details of a computer system that are not relevant to the present invention have been omitted for the purpose of clarity. The computer system S includes a microprocessor 20 that is connected to a first level cache C1 that is preferably located on the same chip 22 as the processor 20. The chip 22 includes a C1 cache controller 30 that is connected to the C1 cache and controls the operation of the C1 cache. The processor 20, the first level cache C1, and the first level cache controller 30 are connected to a system bus 24 through a local processor bus 25. A second level cache C2 is connected to the local processor bus 25. A second level cache controller, referred to as the C2 cache controller 32, is connected to the C2 cache and the local processor bus 25. Random access memory 26, which is 4 Gigabytes in size according to the present embodiment, and an intelligent bus master 28 are connected to the system bus 24. The random access memory (RAM) 26, includes a system memory controller (not shown) that controls the operation of the RAM 26. The RAM 26 and the system memory controller (not shown) are hereinafter referred to as main memory 26. The system bus 24 includes a data bus and a 32-bit address bus, the address bus including address bits A2 to A31, which allows access to any of $2^{30}$ 32-bit doublewords in main memory 26. The bus master 28 may be any of the type that controls the system bus 24 when the processor system is on hold, such as the system direct memory access (DMA) controller, a hard disk interface, a local area network (LAN) interface or a video graphics processor system.

The C1 and C2 caches are aligned on a "way" basis such that a copy of data placed in a particular way in one of the caches can only be placed in a predetermined corresponding way in the other cache. This "way" alignment requires that the C2 cache have at least as many cache ways as does the C1 cache. If the C1 and C2 caches have the same number of ways, then there is a one-to-one correspondence between the cache ways in the C1 cache and the cache ways in the C2 cache. If the C2 cache has more cache ways than the C1 cache, then each cache way in the C1 cache corresponds to one or more cache ways in the C2 cache. However, no two C1 cache ways can correspond to the same C2 cache way. This requirement stems from the fact that each memory address has only one possible location in each of the C1 and C2 caches. Accordingly, if two C1 cache ways corresponded to a single C2 cache way, then there would be memory address locations residing in the C1 cache that would be incapable of residing in the C2 cache. The respective C2 cache way location would be incapable of holding the two memory addresses which would reside in each of the respective C1 cache ways that corresponded to the respective C2 cache way location.

The actual size of each of the caches is not important for the purposes of the invention. However, the C2 cache must be at least as large as the C1 cache to achieve multilevel inclusion, and the C2 cache is preferably at least four times as large as the C1 cache to provide for an improved cache hit rate. In the preferred embodiment of the present invention, the C1 cache is 8 kbytes in size and the C2 cache is preferably 512 kbytes in size. In this embodiment, the C1 cache and the C2 cache are each 4-way set associative caches. In an alternate embodiment of the present invention, the C1 and C2 caches are each 2-way set-associative caches.

Figure 2:
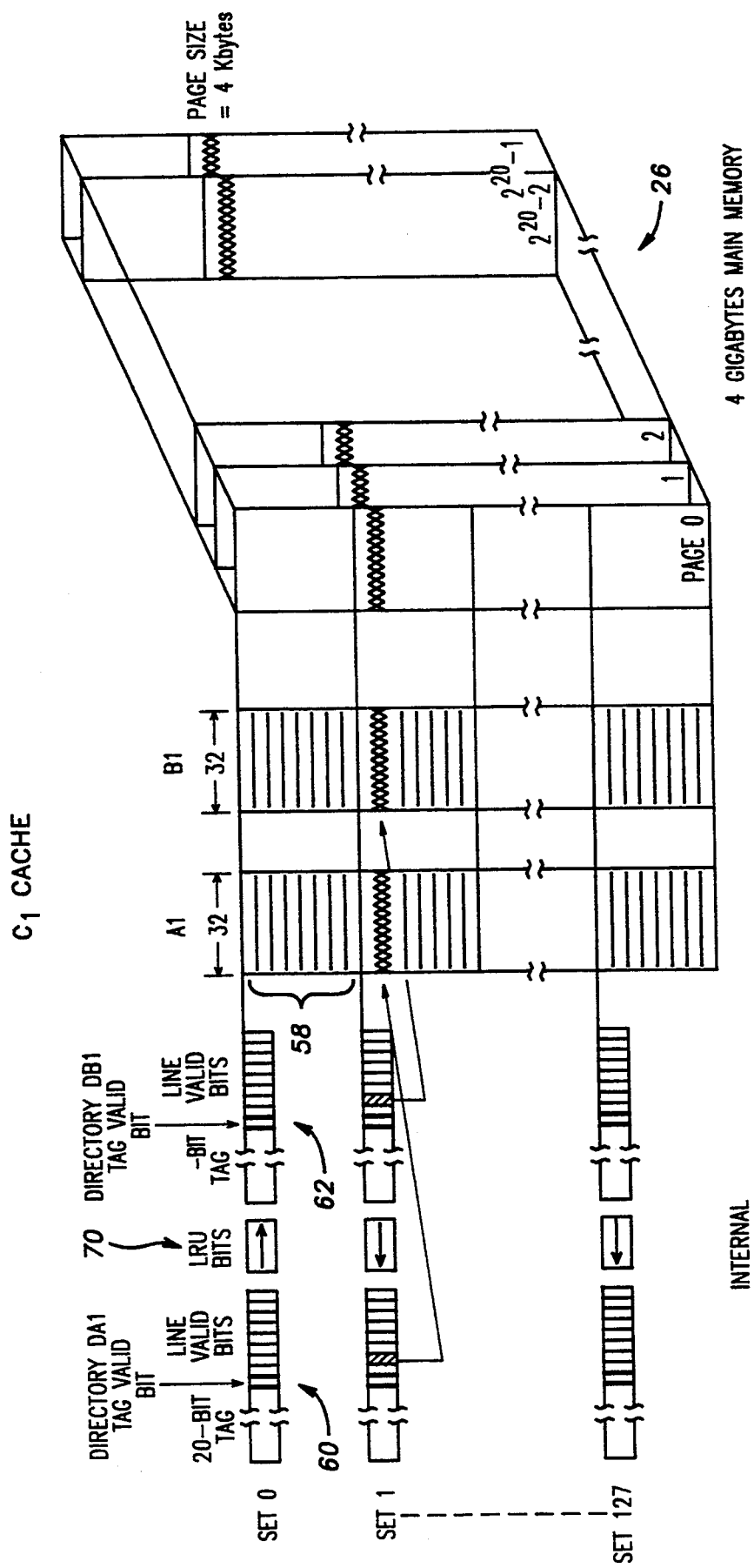
FIG. 2 depicts the organization of the 2-way set associative C1 cache of FIG. 1.
Figure 3:
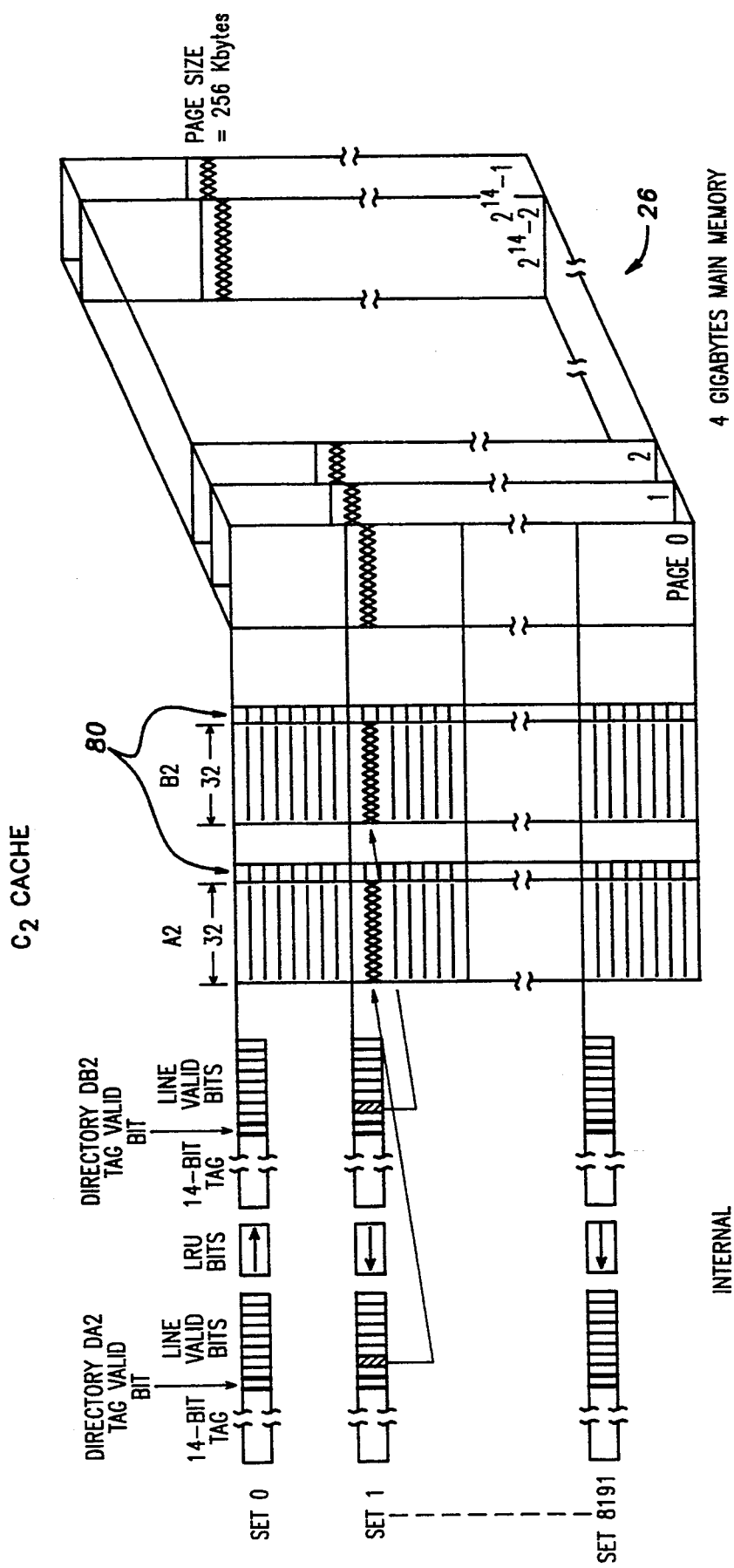
FIG. 3 depicts the organization of the 2-way set associative C2 cache of FIG. 1.

Referring now to FIGS. 2 and 3, conceptual diagrams of the C1 and C2 caches with their respective cache controllers 30 and 32 configured in a 2-way set-associative organization are generally shown. The following discussion is intended to provide an introduction to the structure and operation of a set-associative cache as well as the relationship between the cache memory, cache directories, and main memory 26. The C1 and C2 caches are discussed with reference to a 2-way set-associative cache organization as a simpler example of the more complex 4-way set-associative cache organization of the preferred embodiment. The special cache controller design considerations that arise in a 4-way set-associative cache organization that do not occur in a 2-way set-associative organization are noted in the following discussion.

The C1 cache includes two banks or ways of memory, referred to as A1 and B1, which are each 4 kbytes in size. Each of the cache ways A1 and B1 are organized into 128 sets, with each set including eight lines 58 of memory storage. Each line includes one 32-bit doubleword, or four bytes of memory. Main memory 26 is conceptually organized as $2^{20}$ pages with a page size of 4 kbytes, which is equivalent to the size of each C1 cache way A1 and B1. Each conceptual page in main memory 26 includes 1024 lines, which is the same number of lines as have each of the cache ways A1 and B1. The unit of transfer between the main memory 26 and the C1 cache is one line.

A particular line location, or page offset, from each of the pages in main memory 26, maps to the similarly located line in each of the cache ways A1 and B1. For example, as shown in FIG. 2 the page offset from each of the pages in main memory 26 that is shaded maps to the equivalently located, and shaded, line offset in each of the cache ways A1 and B1. In this way, a particular page offset memory location from main memory 26 can only map to one of two locations in the C1 cache, these locations being in each of the cache ways A1 and B1.

Each of the cache ways A1 and B1 include a cache directory, referred to as directory DA1 and directory DB1, respectively, that are located in the C1 cache controller 30 of the C1 cache. The directories DA1 and DB1 each include one entry 60 and 62, respectively, for each of the 128 sets in the respective cache way A1 and B1. The cache directory entry for each set has three components: a tag, a tag valid bit, and eight line valid bits, as shown. The number of line valid bits equals the number of lines in each set. The 20 bits in the tag field hold the upper address bits, address bits A12 to A31, of the main memory address location of the copy of data that resides in the respective set of the cache. The upper address bits address the appropriate 4 kbyte conceptual page in main memory 26 where the data in the respective set of the cache is located. The remaining address bits from this main memory address location, address bits A2 to A11 can be partitioned into a set address field comprising seven bits, A5 to A11, which are used to select one of the 128 sets in the C1 cache, and a line address field comprising 3 bits, A2 to A4, which are used to select an individual line from the eight lines in the selected set. Therefore, the lower address bits A2 through A11 serve as the "cache address" which directly selects one of the line locations in each of the ways A1 and B1 of the C1 cache.

When the microprocessor initiates a memory read cycle, the address bits A5 to A11 are used to select one of the 128 sets, and the address bits A2 to A4 are used to select one of the respective line valid bits within each entry in the respective directories DA1 and DB1 from the selected set. The lower address bits A2 to A11 are also used to select the appropriate line in the C1 cache. The cache controller compares the upper address bit tag field of the requested memory address with each of the tags stored in the selected directory entries of the selected set for each of the cache ways A1 and B1. At the same time, both the tag valid and line valid bits are checked. If the upper address bits match one of the tags, and if both the tag valid bit and the appropriate line valid bits are set for the respective cache way directory where the tag match was made, the result is a cache hit, and the corresponding cache way is directed to drive the selected line of data onto the data bus.

A miss can occur in either of two ways. The first is known as a line miss and occurs when the upper address bits of the requested memory address match one of the tags in either of the directories DA1 or DB1 of the selected set and the respective tag valid bit is set, but the respective line valid bit(s) where the requested data resides are clear. The second is called a tag miss and occurs when either the upper address bits of the requested memory address do not match either of the respective tags in directories DA1 or DB1 of the selected set where the requested data is located, or the respective tag valid bit for each of the directories DA1 or DB1 are not clear.

The C1 cache controller 30 includes a replacement algorithm that determines which cache way, A1 or B1, in which to place new data. The replacement algorithm used is a least recently used (LRU) algorithm that places new data in the cache way that was least recently accessed by the processor for data. This is because, statistically, the way most recently used is the way most likely to be needed again in the near future. The C1 cache controller 30 includes a directory 70 that holds a LRU bit for each set in the cache, and the LRU bit is pointed away from the cache way that was most recently accessed by the processor. Therefore, if data requested by the processor resides in way A1, then the LRU bit is pointed toward B1. If the data requested by the processor resides in way B1, then the LRU bit is pointed toward A1.

In the 4-way set-associative C1 cache organization of the preferred embodiment, a more elaborate LRU or pseudo-LRU replacement algorithm can be used in the C1 cache controller 30. The choice of a replacement algorithm is generally irrelevant to the present invention, and it is suggested that an LRU or pseudo-LRU algorithm be chosen to optimize the particular cache design used in the chosen embodiment. One replacement algorithm that can be used in the C1 cache controller 30 in the 4-way set-associative C1 cache organization of the preferred embodiment is a pseudo-LRU algorithm which operates as follows. The 4-way set-associative C1 cache includes four ways of memory referred to as W0, W1, W2, and W3. Three bits, referred to as X0, X1, and X2, are located in the C1 cache controller 30 and are defined for a respective set in each of the ways in the 4-way C1 cache. These bits are called LRU bits and are updated for every hit or replace in the C1 cache. If the most recent access in the respective set was to way W0 or way W1, then X0 is set to 1 or a logic high value. Bit X0 is set to 0 or a logic low value if the most recent access was to way W2 or way W3. If X0 is set to 1 and the most recent access between way W0 and way W1 was to way W0, then X1 is set to 1, otherwise X1 is set to 0. If X0 is set to 0 and the most recent access between way W2 and way W3 was to way W2, then X2 is set to 1, otherwise X2 is set to 0.

The pseudo LRU replacement mechanism works in the following manner. When a line must be replaced in the 4-way C1 cache, the C1 cache controller 30 uses the X0 bit to first select the respective ways W0 and W1 or W2 and W3 where the particular line relocation candidate that was least recently used is located. The C1 cache controller then utilizes the X1 and X2 bits to determine which of the two selected cache ways W0 and W1 or W2 and W3 holds the respective line location that was least recently used, and this line location is marked for replacement.

The C1 cache controller 30 broadcasts its LRU information to the C2 cache controller 32 on C1 and C2 cache read misses and on processor writes according to the present invention. In this manner, the C2 cache controller 32 is able to place the copy of data that it receives from either the main memory 26 on read misses or from the processor 20 on processor writes into the C2 cache way corresponding to the C1 cache way where the C1 cache controller placed the copy of data, thereby achieving multilevel inclusion. In addition, the C1 cache controller 30 ignores its LRU replacement algorithm on a C1 cache read miss and a C2 cache read hit so that the C1 cache controller 30 can place the copy of data that it receives from the C2 cache controller 32 in the C1 cache way corresponding to the C2 cache way where the read hit occurred.

The 2-way set-associative C2 cache is organized in a manner similar to that of the 2-way set-associative C1 cache. In the preferred embodiment, the C2 cache preferably comprises 512 kbytes of cache data RAM. Referring now to FIG. 3, each cache way A2 and B2 in the C2 cache is 256 kbytes in size and includes 8192 sets of eight lines each. The line size in the C2 cache is one 32-bit doubleword, which is the same as that of the C1 cache. The 4 Gigabyte main memory 26 is organized into $2^{14}$ conceptual pages with each conceptual page being 256 kbytes in size. The number of conceptual pages of main memory 26 for the C2 cache is less than that of the C1 cache because the conceptual page size for the C2 cache is greater than that of the C1 cache. As in the C1 cache, each line location or page offset in main memory 26 maps to a similarly located line in each of the cache ways A2 and B2.

The C2 cache controller 32 includes cache way directories DA2 and DB2. The cache way directories DA2 and DB2 have set entries which include 14-bit tag fields, as opposed to the 20-bit tag fields in the entries of the C1 cache directories DA1 and DB1. The 14-bit tag fields hold the upper address bits, address bits A18 to A31, that address the appropriate 256 kbyte conceptual page in main memory 26 where the data in the respective set of the cache is located. The remaining address bits, A2 to A17, can be partitioned into a set address field comprising thirteen bits, A5 to A17, which are used to select one of the 8192 sets in the C2 cache, and a line address field comprising 3 bits, A2 to A4, which are used to select an individual line from the eight lines in the selected set. Therefore, in the C2 cache the lower address bits A2 to A17 serve as the "cache address" which directly selects one of the line locations in each of the ways A2 and B2 of the C2 cache.

The C2 cache controller 32 according to the present invention does not generally require a replacement algorithm because the C2 cache receives new data only on C1 and C2 cache read misses and on processor writes, and in those instances the C2 cache controller receives the way location from the C1 cache controller and must fill the corresponding C2 cache way. Therefore, the C2 cache controller 32 does not need a replacement algorithm because the respective C2 cache way where data is placed is determined by the data's way location in the C1 cache. However, if the C2 cache has more ways than has the C1 cache, then the C2 cache controller 32 will require use of a replacement algorithm. In this instance, a C1 cache way will correspond to two or more C2 cache ways. Accordingly, when the C1 cache controller 30 broadcasts the C1 cache way location to the C2 cache controller 32, the C2 cache controller 32 will need a replacement algorithm in order to decide between the multiple C2 cache ways that correspond to the C1 cache way location in which to place the received data.

The 2-way set-associative C1 and C2 caches are aligned on a "way" basis such that the ways A1 and B1 in the C1 cache have a one-to-one correspondence with the ways A2 and B2, respectively, of the C2 cache. In this manner, a page offset from main memory 26 that is placed in the respective line location in a C1 cache way A1 or B1 has only one possible location in the corresponding C2 cache way A2 or B2, respectively. Conversely, a respective line location in a C2 cache way A2 or B2 has only one possible location in the corresponding C1 cache way A1 or B1, respectively. However, because the C2 cache is 64 times as large as the C1 cache, each of the C2 cache ways A2 or B2 hold 64 lines of data that each correspond to, or could be located in, a single line or page offset location in the corresponding C1 cache way A1 or B1. Therefore, the C2 cache controller 32 according to the present invention includes inclusion bits 80 for each of its respective lines. This enables the C2 cache controller 32 to remember whether a copy of data from the respective C2 cache line also resides in the corresponding C1 cache line location.

The use of inclusion bits 80 allows the C2 cache controller 32 to remember which of the 64 lines of data in the respective C2 cache way A2 or B2 that corresponds to a single C1 cache way location holds a copy of data that is duplicated in that C1 cache location. For example, if a line in the C2 cache receives a copy of data from main memory 26 that was also placed in the C1 cache, or if a line in the C2 cache provides a copy of data that is placed in the C1 cache, then an inclusion bit for the respective C2 cache line is true or set to a logic high value, signifying that the respective C2 cache line holds a copy of data that is duplicated in the respective C1 cache location. The other 63 line locations in the C2 cache which correspond to the respective C1 cache location involved in the above operation have their inclusion bits cleared as a reminder that the copy of data that they hold is not duplicated in a C1 cache location. This is important because one of these other 63 line locations may hold data that was previously duplicated in the respective C1 cache location before one of the operations mentioned above placed new data in the respective C1 cache location, and therefore one of these 63 locations may have its inclusion bit set. The only instance where one of these other 63 C2 cache locations would not have its inclusion bit set is when the respective C2 cache line location that was involved in the above operation and had its inclusion bit set also held the copy of data that was duplicated in the respective C1 cache location before the operation took place and therefore already had its inclusion bit set.

Figure 4A:
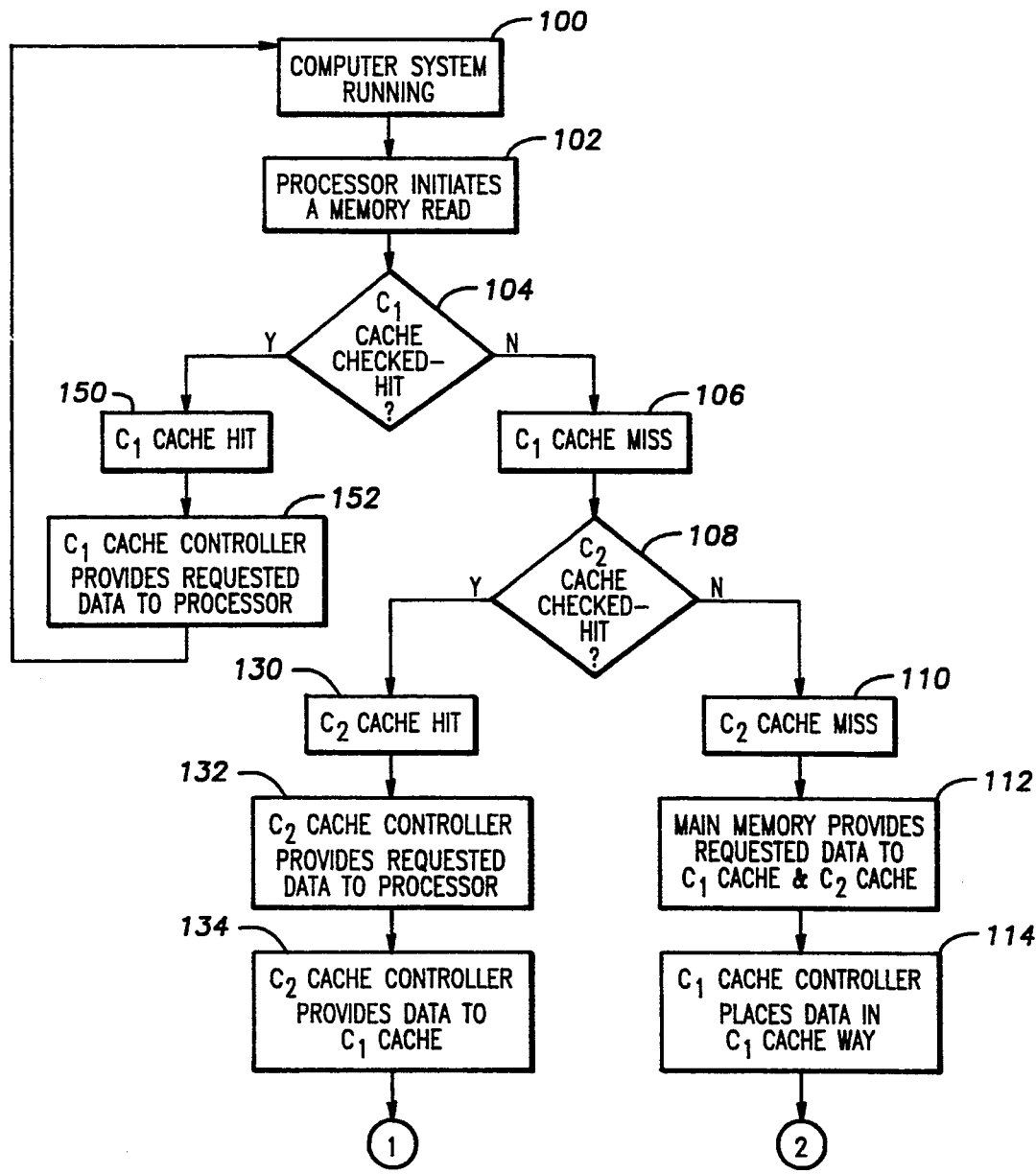
FIGS. 4A and 4B depict a flowchart illustrating the operation of cache read hits and misses according to the present invention.
Figure 4B:
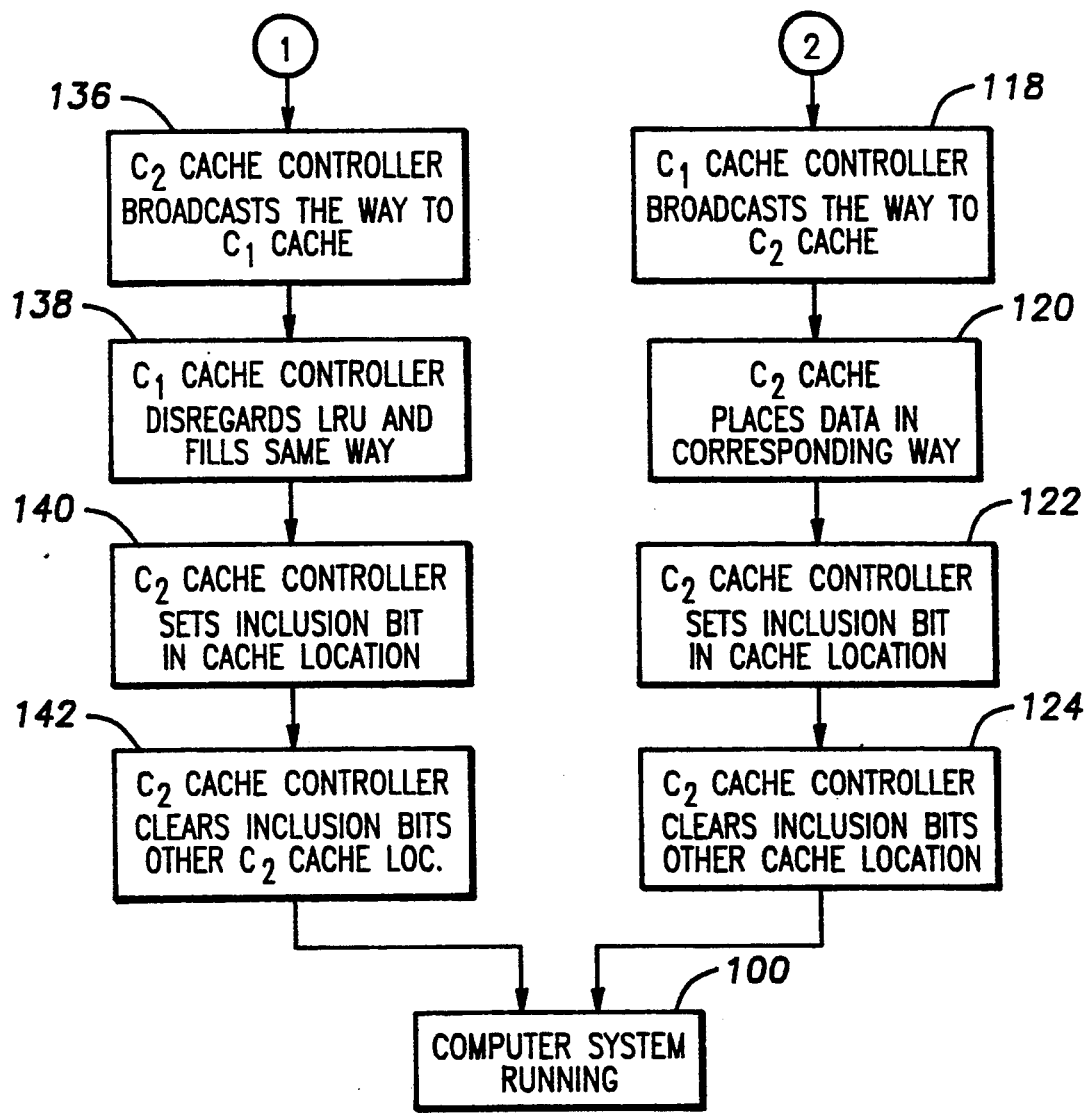

Referring now to FIGS. 4A and 4B, a flowchart describing the operation of the C1 and C2 caches according to the present invention is shown. It is understood that numerous of these operations may occur concurrently, but a flowchart format has been chosen to simplify the explanation of the operation. For clarity, the flowchart is shown in two portions, with the interconnections between FIGS. 4A and 4B designated by reference to the circled numbers one and two. Step 100 represents that the computer system S is operating or turned on. In some computer systems, the processor is required to have control of the system bus 24 before it may issue memory reads or writes. However, in the system S according to the preferred embodiment, the processor 20 is not required to have control of the system bus 24 when it issues memory reads or writes but rather the processor 20 can operate out of the C1 cache and the C2 cache without requiring use of the system bus 24 until a C1 and C2 cache read miss or a processor write beyond any posting depth occurs.

When the processor 20 attempts a main memory read in step 102, the C1 cache controller 30 first checks the C1 cache in step 104 to determine if a copy of the requested main memory data resides in the C1 cache. If a copy of the requested data does not reside in the C1 cache, then a C1 cache read miss occurs in step 106, and the read operation is passed on to the C2 cache, where the C2 cache controller 32 then checks the C2 cache in step 108. If a copy of the requested data does not reside in the C2 cache, then a C2 cache read miss occurs in step 110, and the operation is passed onto the system memory controller to obtain the necessary data from main memory 26.

Main memory 26 provides the requested data to the C1 cache, the C2 cache and the processor 20 in step 112, and the C1 cache controller 30 places the data into one of its cache ways A1 or B1 according to its particular replacement algorithm in step 114. The data is placed in the C1 cache because of the statistical likelihood that this data will be requested again soon by the processor 20. The C1 cache controller 30 during this period has been broadcasting to the C2 cache controller 32 the particular C1 cache way A1 or B1 in which it is placing the data, represented in step 118, so that the C2 cache controller 32 can place the data in the corresponding C2 cache way A2 or B2 in step 120. The C2 cache controller 32 sets the inclusion bit on the respective C2 cache memory location where the data is stored in step 122, signifying that a copy of the data in this location also resides in the C1 cache. The C2 cache controller 32 also clears the inclusion bits on the other 63 C2 cache locations that correspond to the same page offset location in the C1 cache in step 124 to signify that a copy of the data in these locations does not reside in the C1 cache. Upon completion of the memory read, the computer system returns to step 100.

The above sequence of events occurs on a C1 and C2 cache read miss and also when the computer system S is first turned on because the C1 and C2 caches are both empty at power on of the computer system S and C1 and C2 cache misses are therefore guaranteed. The majority of processor memory reads that occur immediately after power on of the computer system S will be C1 and C2 cache misses because the C1 and C2 caches are relatively empty at this time. In this manner, the C1 and C2 caches are filled with data and align themselves on a "way" basis wherein data in a particular way A1 or B1 in the C1 cache is guaranteed to be located in the corresponding cache way A2 or B2 in the C2 cache. In addition, when the computer system S has been operating for a while and a C1 and C2 cache read miss occurs, the resulting line fills of data in the C1 and C2 caches are performed as described above and therefore the "way" alignment is maintained.

When the processor 20 initiates a main memory read in step 102 and the C2 cache controller 32 checks the C2 cache in step 108 after a C1 cache miss occurs in step 106, and a copy of the requested data resides in the C2 cache, then a C2 cache hit occurs in step 130. The C2 cache controller 32 provides the requested data to the processor 20 in step 132, and also provides the data to the C1 cache in step 134 due to the statistical likelihood that this data will be requested again soon by the processor 20. The C2 cache controller 32 informs the C1 cache controller 30 as to the particular C2 cache way A2 or B2 in which the data is located in the C2 cache in step 136 so that the C1 cache controller 30 can place the data in the corresponding C1 cache way A1 or B1 in step 138. This requires that the C1 cache controller 30 disregard its normal LRU replacement algorithm because the replacement algorithm may choose a different C1 cache way A1 or B1 in which to place the data. In this manner, the C1 and C2 caches maintain their "way" alignment without a requirement for the C2 cache controller 32 to transfer data between the ways in the C2 cache. The C2 cache controller 32 sets the inclusion bit on the C2 cache location where the requested data is located in step 140, signifying that a copy of this data also resides in the C1 cache. The C2 cache controller 32 also clears the other 63 inclusion bits on the C2 cache memory locations that correspond to the same page offset location to signify that a copy of the data in these locations does not reside in the C1 cache. The computer system S is then finished with the memory read and returns to step 100.

When the processor 20 initiates a memory read in step 102 and checks the contents of the C1 cache in step 104 to determine if a copy of the requested data resides there, and a copy of the requested data does reside in the C1 cache, then a C1 cache hit takes place in step 150. The C1 cache controller 30 provides the requested data to the processor 20 in step 152, and operation of the computer system S is resumed in step 100. Since multilevel inclusion exists in the cache subsystem, the C2 cache is guaranteed to have a copy of the data that the C1 cache controller 30 provided to the processor 20, and no transfer of data from the C1 cache controller 30 to the C2 cache controller 32 is necessary when a C1 cache read hit takes place.

The cache architecture of the C1 cache in the preferred embodiment is preferably a write-through cache architecture and the cache architecture of the C2 cache is preferably a write-back cache architecture. However, the use of other cache architectures for the C1 cache and the C2 cache is also contemplated. When the processor 20 performs a memory write operation, the data is written into the C1 cache, regardless of whether the processor write is a C1 cache write hit or write miss. In addition, processor writes initiate external write bus cycles to write the respective data into the C2 cache. When this occurs, the C1 cache controller 30 broadcasts the particular C1 cache way where the data was placed so that the C2 cache controller 32 can place the data in the corresponding C2 cache way. Therefore, the C1 and C2 caches allocate write misses according to the present invention. It is preferred that the C1 and C2 either both allocate write misses or both do not allocate write misses. If the C1 cache were to not allocate writes and the C2 cache were to allocate writes, the designs would be more complicated. The C2 cache controller 32 would require an LRU algorithm and would need to insure that if the C2 cache controller LRU algorithm selected a particular C2 cache way that contains a copy of data that is duplicated in the C1 cache, the LRU algorithm would be overridden or the caching aborted so that multilevel inclusion remained guaranteed.

Figure 5:
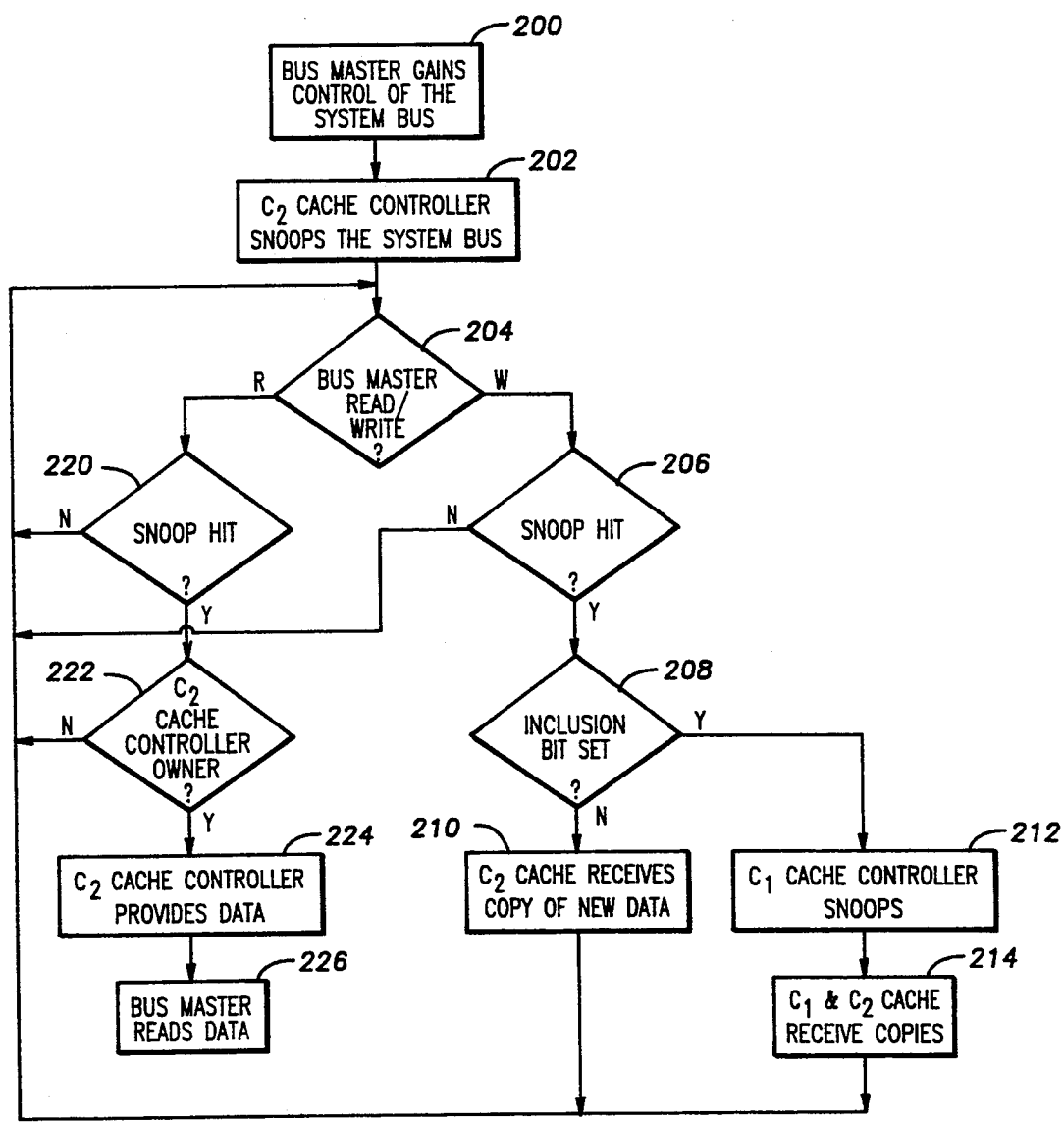
FIG. 5 is a flowchart illustrating the operation of read and write snooping according to the present invention.

Referring now to FIG. 5, when the intelligent bus master 28 gains control of the system bus 24 in step 200, the C2 cache controller 32 watches or "snoops" the system bus 24 in step 202 to see if the bus master 28 performs any writes, and reads in the case of a write-back cache, to main memory 26, and, if so, which memory location is being accessed. The C2 cache controller 32 can perform the snooping responsibilities for both the C1 and C2 caches because the C2 cache is guaranteed to have a copy of all the data that resides in the C1 cache due to the multilevel inclusion.

If the bus master 28 writes to main memory 26 in step 204 and a write snoop hit occurs in the C2 cache in step 206, then the C2 cache controller 32 checks the inclusion bit for the respective C2 cache location to see whether the C1 cache controller 30 must also snoop the memory access in step 208. If the inclusion bit is not set in step 208, then a copy of the data from the memory location being written to does not reside in the C1 cache, and the C1 cache controller 30 is left alone. In this case, the C2 cache receives the new copy of data in step 210 and the C2 cache controller 32 resumes its snooping duties in step 202. If the inclusion bit on the C2 cache memory location is set in step 208 after a snoop hit in step 206, then the C2 cache controller directs the C1 cache controller 30 to snoop that particular memory access in step 212. In step 214, the C1 and C2 caches each receive a copy of the new data, and the C2 cache controller 32 resumes its snooping duties in step 202. If a snoop miss occurs in step 206 after the bus master 28 writes to a memory location in step 204, then the C2 cache controller 32 resumes its snooping duties in step 202. The C2 cache controller 32 continues to snoop the system bus 24 in step 202 until the bus master 28 is no longer in control of the system bus 24.

If the bus master 28 reads a main memory location in step 204 and a read snoop hit occurs in the C2 cache in step 220, then the C2 cache controller 32 checks the C2 cache location in step 222 to determine if it is the owner of the respective memory location. If not, then main memory 26 or other source services the data request, and the C2 cache controller 32 resumes snooping in step 202. If the C2 cache controller 32 is the owner of the memory location, then the C2 cache controller 32 provides the requested data to main memory 26 in step 224. The bus master 28 reads this data in step 226 when the data has been placed on the data bus, this being referred to as snarfing. The C2 cache controller 32 then resumes its snooping duties in step 202. If a snoop miss occurs in step 220 after the bus master 28 reads a memory location in step 204, then the C2 cache controller 32 resumes its snooping duties in step 202.

In this manner, the C1 cache controller 30 can neglect its snooping duties until the C2 cache controller 32 determines that a snoop hit on data held in the C1 cache has actually occurred. This allows the processor 20 to operate more efficiently out of the C1 cache while it does not have control of the system bus 24 because the C1 cache controller 30 only has to snoop the system bus 24 when a C1 cache snoop hit occurs, not on every memory write as it normally would.

The foregoing disclosure and description of the invention are illustrative and explanatory thereof, and various changes in the size, components, construction and method of operation may be made without departing from the spirit of the invention.

I claim:

1. A method for achieving multilevel inclusion in a computer system having a processor, a system bus, a first level set associative cache controller having a first number of ways, a second level set associative cache memory including a number of ways equal to or greater than the first number of ways of the first level cache memory, wherein each of the ways in the first level cache memory corresponds to at least one way in the second level cache memory, wherein data stored in a way of the first level cache memory is only placed in a corresponding way in the second level cache memory, a second level cache controller, means coupled to the second level cache controller for setting and clearing an inclusion bit associated with a second level cache memory data location based on data stored in the second level cache memory, wherein a set inclusion bit indicates that data stored in the second level cache memory is duplicated in the first level cache memory, the first and second level cache controllers including logic for communicating information and transmitting data between the first level and second level cache memories, a bus master device, and random access memory, the method for achieving multilevel inclusion in a computer system comprising:

the first level cache controller placing a copy of first data received from the random access memory in a particular first level cache way on a first level and second level cache memory read miss;

the first level cache controller communicating the particular first level cache way in which the copy of first data received from the random access memory is placed on a first level and second level cache memory read miss to the second level cache controller;

the second level cache controller placing the copy of first data received from the random access memory in a particular second level cache way corresponding to the first level cache way communicated by the first level cache controller on a first level and second level cache memory read miss;

the second level cache controller communicating to the first level cache controller a particular second level cache way where a copy of second data is located on a first level cache memory read miss and second level cache memory read hit;

the second level cache controller transmitting the copy of second data to the processor on the first level cache memory read miss and second level cache memory read hit;

the first level cache controller placing the copy of second data transmitted from the second level cache controller in a cache memory location in the corresponding first level cache way on the first level cache memory read miss and second level cache memory read hit; and the second level cache controller setting the inclusion bit on the second level cache memory location of the second copy of data and clearing inclusion bits on any other second level cache memory locations that correspond to the first level cache memory location where the first level cache controller placed the second copy of data on the first level cache memory read miss and second level cache memory read hit.

2. The method for achieving multilevel inclusion in a computer system according to claim 1, wherein the first level cache controller includes a replacement algorithm that determines which first level cache way in which to place a received copy of data, the step of the first level cache controller placing the copy of second data transmitted from the second level cache controller into the first level cache way corresponding to the second level cache way including:

the first level cache controller disregarding its replacement algorithm on first level cache memory read miss and second level memory cache read hit cases.

3. The method for achieving multilevel inclusion in a computer system according to claim 1, further comprising:

the first level cache controller communicating to the second level cache controller the particular first level cache way in which a received copy of third data is placed on a microprocessor write; and the second level cache controller placing the copy of received data in the second level cache way corresponding to the first level cache way communicated by the first level cache controller.

4. The method for achieving multilevel inclusion in a computer system according to claim 1, wherein only one way in the first level cache memory corresponds to a cache way in the second level cache memory and a plurality of cache ways in the second level cache memory correspond to one way in the first level cache memory.

5. The method for achieving multilevel inclusion in a computer system according to claim 1, further comprising:

the second level cache controller snooping the system bus when the processor does not have control of the system bus to determine if the bus master device is writing to a main memory location comprising data that is cached in the second level cache memory;

the second level cache controller checking the inclusion bit on a second level cache memory location storing fourth data where a second level cache write snoop hit occurs to determine if a copy of said fourth data that is cached in the second level cache memory resides in the first level cache memory; and the second level cache controller directing the first level cache controller to snoop the system bus if said copy of said fourth data resides in the first level cache memory and the inclusion bit is set.

6. The method for achieving multilevel inclusion in a computer system according to claim 5, wherein the second level cache memory is a write-back cache, the method further comprising:

the second level cache controller snooping the system bus when the processor does not have control of the system bus to determine if the bus master device is reading a main memory location comprising data that is cached in the second level cache memory;

the second level cache controller determining if the second level cache memory has an updated version of the data residing in the main memory location being read by the bus master device on a second level cache read snoop hit;

the second level cache controller providing the updated data to main memory if the second level cache memory has an updated version of the data; and the bus master reading the updated data provided by the second level cache controller.

7. An apparatus for achieving multilevel inclusion in a computer system, comprising:

a system bus;

a microprocessor coupled to said system bus;

a first level cache memory of a given size coupled to said microprocessor and including a first number of ways;

a first level cache controller coupled to said first level cache memory, said microprocessor and said system bus, said first level cache controller including an output for transmitting way information and an input for receiving way information;

a second level cache memory of a size greater than or equal to the size of the first level cache memory, wherein the second level cache memory includes a number of ways equal to or greater than the first number of ways of the first level cache memory, wherein each of the ways in the first level cache memory corresponds to at least one way in the second level cache memory, wherein data stored in a way of the first level cache memory is only placed in a corresponding way in the second level cache memory and wherein the second level cache memory includes inclusion information comprising inclusion bits associated with second level cache memory data locations and indicating presence of data in the second level cache memory that is duplicated in the first level cache memory;

a second level cache controller coupled to said system bus, said second level cache memory, said microprocessor, and said first level cache controller, said second level cache controller including an input coupled to said first level cache controller way information output for receiving way information and an output coupled to said first level cache controller way information input for transmitting way information; and main memory coupled to said system bus;

wherein on a first and second level cache memory read miss said first level cache controller places data received from the main memory in a way of the first level cache memory and transmits way information to said second level cache controller and said second level cache controller places said data from the main memory in a way of the second level cache memory corresponding to the received way information, wherein on a first level cache memory read miss and a second level cache memory read hit said second level cache controller transmits way information to said first level cache controller and said first level cache controller places data received from the second level cache memory in a way of the first level cache memory corresponding to the received way information, and wherein said second level cache controller sets the inclusion bit in the second level cache memory location which contains said data placed in the first level cache memory received from the main memory or the second level cache memory and clears the inclusion bits of other second level cache memory locations which correspond to the first level cache memory location where said data received from the main memory or the second level cache memory was placed.

8. The apparatus for achieving multilevel inclusion in a computer system according to claim 7, wherein said first level cache controller includes a replacement means that determines which first level cache way in which to place a received copy of data, wherein said first level cache controller disregards said replacement means on first level cache read miss and second level cache read hits cases.

9. The apparatus for achieving multilevel inclusion in a computer system according to claim 7, wherein only one way in the first level cache memory corresponds to a cache way in the second level cache memory and a plurality of ways in the second level cache memory correspond to one way in the first level cache memory.

10. The apparatus for achieving multilevel inclusion in a computer system according to claim 7, wherein on a microprocessor write hit to said first level cache memory said first level cache controller transmits way information to said second level cache controller and said second level cache controller places received data in a way of the second level cache memory corresponding to the received way information.

11. The apparatus for achieving multilevel inclusion in a computer system according to claim 7, further comprising:

a bus master device coupled to said system bus; and wherein said first level cache controller includes means for snooping the system bus when said microprocessor does not have control of said system bus to determine if the bus master device is writing to a main memory location that is cached in the first level cache memory, and wherein said second level cache controller further includes:

means for snooping the system bus when said microprocessor does not have control of said system bus to determine if the bus master device is writing to a main memory location that is cached in the second level cache memory;

means for checking the inclusion bit on a second level cache location where a second level cache write snoop hit occurs to determine if a copy of data from said main memory location being written to also resides in said first level cache memory; and means coupled to said first level cache controller which directs said first level cache controller to snoop the system bus if said second level cache write snoop hit occurs and said inclusion bit is set.

12. The apparatus for achieving multilevel inclusion in a computer system according to claim 11, further comprising:

said second level cache memory being a write-back cache, wherein said second level cache controller further includes:

means for snooping the system bus when said microprocessor does not have control of said system bus to determine if the bus master device is reading a main memory location that is cached in the second level cache memory;

means for determining whether the second level cache memory includes an updated version of the data residing in the memory location being read by the bus master device when a second level cache read snoop hit occurs; and means for providing the requested data to main memory if a second level cache read snoop hit occurs and the second level cache has said updated version of the data, wherein the bus master device reads the requested data provided by the second level cache controller.

* * * * *